United States Patent [19]
Oliveira

[11] Patent Number: 5,419,607
[45] Date of Patent: May 30, 1995

[54] TENT SYSTEM FOR A PICK-UP TRUCK

[76] Inventor: John C. Oliveira, 1139 Rising Glen Rd., Pinole, Calif. 94564

[21] Appl. No.: 164,820

[22] Filed: Dec. 10, 1993

[51] Int. Cl.$^6$ ............................................. B60P 3/345
[52] U.S. Cl. ................................... 296/159; 296/161; 296/165; 135/88.07
[58] Field of Search ............... 296/159, 156, 161, 164, 296/165; 135/88

[56] References Cited

U.S. PATENT DOCUMENTS

| | | | |
|---|---|---|---|
| 2,122,681 | 7/1938 | Dykes | 135/88 |
| 3,756,649 | 9/1973 | Wines | 135/88 |
| 3,968,809 | 7/1976 | Beavers | 135/88 |
| 4,109,954 | 8/1978 | Wall | 296/161 |
| 4,607,876 | 8/1986 | Reed | 296/159 |
| 4,867,502 | 9/1989 | Sylvester | 135/88 |
| 5,018,778 | 5/1991 | Goble | 296/161 X |
| 5,102,185 | 4/1992 | Lake | 296/165 |

FOREIGN PATENT DOCUMENTS 1603334 11/1981 United Kingdom ............... 135/88

Primary Examiner—Dennis H. Pedder

[57] ABSTRACT

A tenting system for use in association with the bed of a pick-up truck comprising a container having a separable, generally rectangular piece of hard material constituting a floor outside of the truck bed when deployed and positionable within the container when in storage, the floor being fabricated of a rigid material and configured to be essentially the same size as that of the container; a rigid lid of a size to cover the container with a hinge coupled to the forward edge of the lid, fabric material located between the side edges of the container and the parallel edges of the lid adjacent to the hinge and transverse to the hinge with an adjustable rod for support; and a tent having parallel sidewalls transverse to the hinge and a rear wall with an entry flap and an open forward end positionable over the upper rear extent of the lid when deployed to allow for communication between the interior of the tent and the interior of the pick-up, the tent having poles for support when deployed and associated tie down members at the leading upper edge of the tent for coupling with respect to the raised lid.

1 Claim, 4 Drawing Sheets

TENT SYSTEM FOR A PICK-UP TRUCK

BACKGROUND OF THE INVENTION

1. Field of the Invention

The present invention relates to a tent system for a pick-up truck and more particularly pertains to a system which incorporates a rearward tent in operative association with an area above the bed of a truck for an improved camping accommodation.

2. Description of the Prior Art

The use of tents in association with pick-up trucks is known in the prior art. More specifically, tent-truck combinations heretofore devised and utilized for the purpose of camping are known to consist basically of familiar, expected and obvious structural configurations, notwithstanding the myriad of designs encompassed by the crowded prior art which have been developed for the fulfillment of countless objectives and requirements.

The prior art, by way of example, shows a plurality of tent devices including those adapted to be used in association with the bed of a pick-up truck. By way of example, U.S. Pat. Nos. 4,310,194 to Biller and 4,652,040 to Mahon relate to tent-like structures operable in association with a pick-up truck where the entire contents of the tent are contained on the truck or the lowered tail gate.

In addition, U.S. Pat. No. 3,466,082 to Branch discloses a pick-up truck bed mounted camper tent wherein the expansion of the tent is laterally with respect to the bed.

Lastly, U.S. Pat. Nos. 4,566,729 to Magnino and 4,955,660 to Leonard disclose tent structures for pick-up trucks of conventional designs wherein the contents are located generally within the preface of the pick-up. No prior art structure discloses the coupling of a pick-up with a supplemental tent consistent configurations as disclosed in claims herein.

In this respect, the tent system for a pick-up truck according to the present invention substantially departs from the conventional concepts and designs of the prior art, and in so doing provides an apparatus primarily developed for the purpose of more convenient camping.

Therefore, it can be appreciated that there exists a continuing need for new and improved tent systems for pick-up trucks which can be efficiently, conveniently and economically utilized. In this regard, the present invention substantially fulfills this need.

SUMMARY OF THE INVENTION

This invention provides an improved tent system for a pick-up truck. The general purpose of the present invention, which will be described subsequently in greater detail, is to provide a new and improved tent system for a pick-up truck apparatus and method which has all the advantages of the prior art tent-truck combinations and none of the disadvantages.

To attain this, the present invention essentially comprises a container which includes a separable, generally rectangular piece of hard material constituting a floor outside of the truck bed when deployed and positionable within the container over the wheel tubs of the truck when in storage. The container is fabricated of a rigid material and configured to be essentially the same size as that of the truck bed. The region beneath the floor forwardly of the wheel tubs constitutes a region for the storage of mattresses and the like, the region under the floor between the wheel tubs constitutes a location for the storage of clothing and gear and the region beneath the floor rearwardly of the wheel tubs functions for the storage of a cooler, stove and supporting equipment. The region immediately beneath the floor constitutes a region for the storage of tents and poles.

Also provided is a rigid lid of a size to cover the bed of a pick-up truck with a hinge coupled to the forward edge of the lid and the forward edge of the container. Fabric material with screens is located between the side edges of the container and the parallel edges of the lid adjacent to the hinge and transverse to the hinge. The lid and fabric material are adapted to be raised to an angled elevated orientation during deployment with an adjustable rod for support and adapted to be rested upon the upper edges of the container during storage to seal the contents of a pick-up.

Further provided is a tent having parallel sidewalls transverse to the hinge and a rear wall with an entry flap and an open forward end positionable over the upper rear extent of the lid when deployed to allow for communication between the interior of the tent and the interior of the pick-up. The tent also has poles for support when deployed and associated tie down members at the forward upper edge of the tent for coupling with respect to the raised lid.

A fabric section is positionable over the tail gate of the pick-up with a depending section to shield the interior of the tent from the space beneath the tail gate. The fabric section has pile-type fasteners at its lateral edges for coupling with the adjacent sides of the tent.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved tent system for a pick-up truck which has all the advantages of the prior art tent-truck combinations and none of the disadvantages.

It is another object of the present invention to provide a new and improved tent system for a pick-up truck which may be easily and efficiently manufactured and marketed.

It is a further object of the present invention to provide a new and improved tent system for a pick-up truck which is of a durable and reliable construction.

An even further object of the present invention is to provide a new and improved tent system for a pick-up truck which is susceptible of a low cost of manufacture with regard to both materials and labor, and which accordingly is then susceptible of low prices of sale to the consuming public, thereby making such tent system for a pick-up truck economically available to the buying public.

Still yet another object of the present invention is to provide a new and improved tent system for a pick-up truck which provides in the apparatuses and methods of the prior art some of the advantages thereof, while simultaneously overcoming some of the disadvantages normally associated therewith.

Still another object of the present invention is to facilitate the erection of camping gear which utilizes the space of beds of pick-up trucks.

Yet another object of the present invention is to enhance the enjoyment of outdoor activities by sports persons.

Even still another object of the present invention is to provide a new and improved tenting system for use in association with the bed of a pick-up truck comprising a container having a separable, generally rectangular piece of hard material constituting a floor outside of the truck bed when deployed and positionable within the container when in storage, the floor being fabricated of a rigid material and configured to be essentially the same size as that of the truck bed; a rigid lid of a size to cover the container with a hinge coupled to the forward edge of the lid, fabric material located between the side edges of the container and the parallel edges of the lid adjacent to the hinge and transverse to the hinge with an adjustable rod for support; and a tent having parallel sidewalls transverse to the hinge and a rear wall with an entry flap and an open forward end positionable over the upper rear extent of the lid when deployed to allow for communication between the interior of the tent and the interior of the pick-up, the tent having poles for support when deployed and associated tie down members at the leading upper edge of the tent for coupling with respect to the raised lid.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
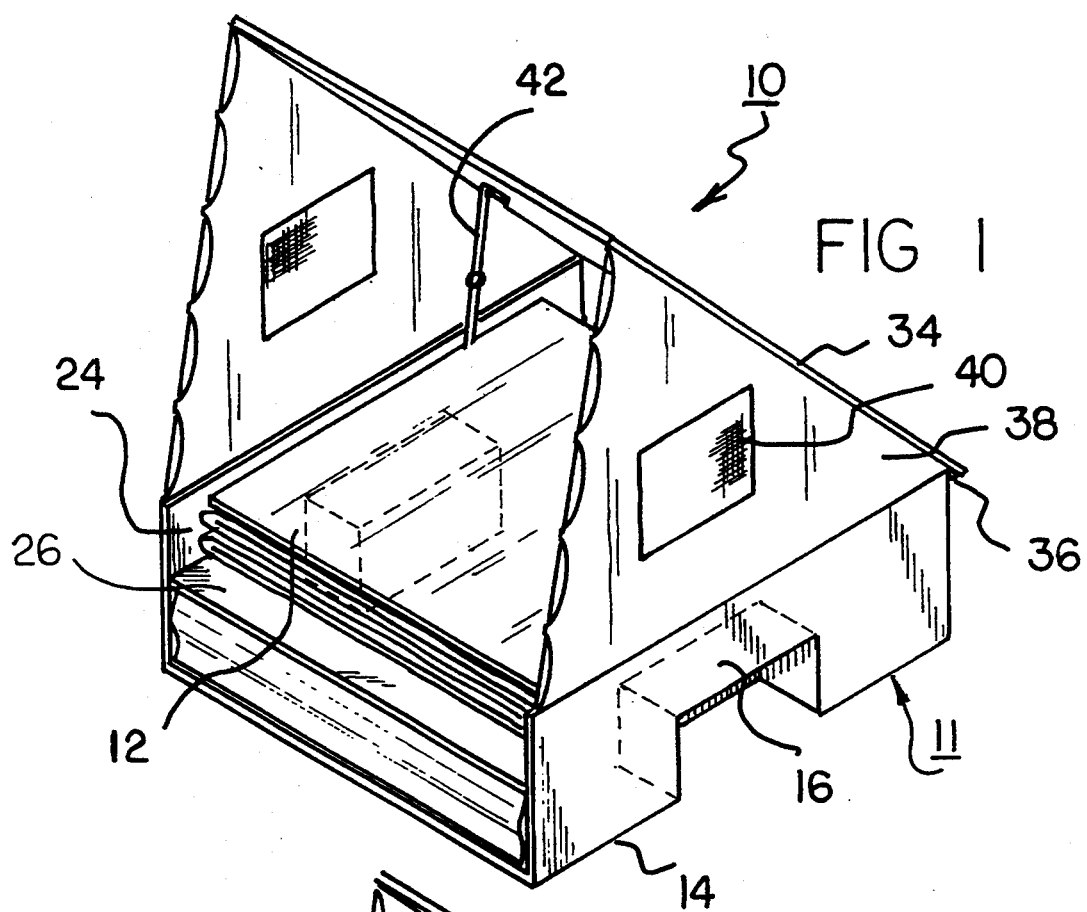
FIG. 1 is a perspective illustration of a portion of a container and associated tent in a partially deployed orientation constructed in accordance with the principles of the present invention.
Figure 2:
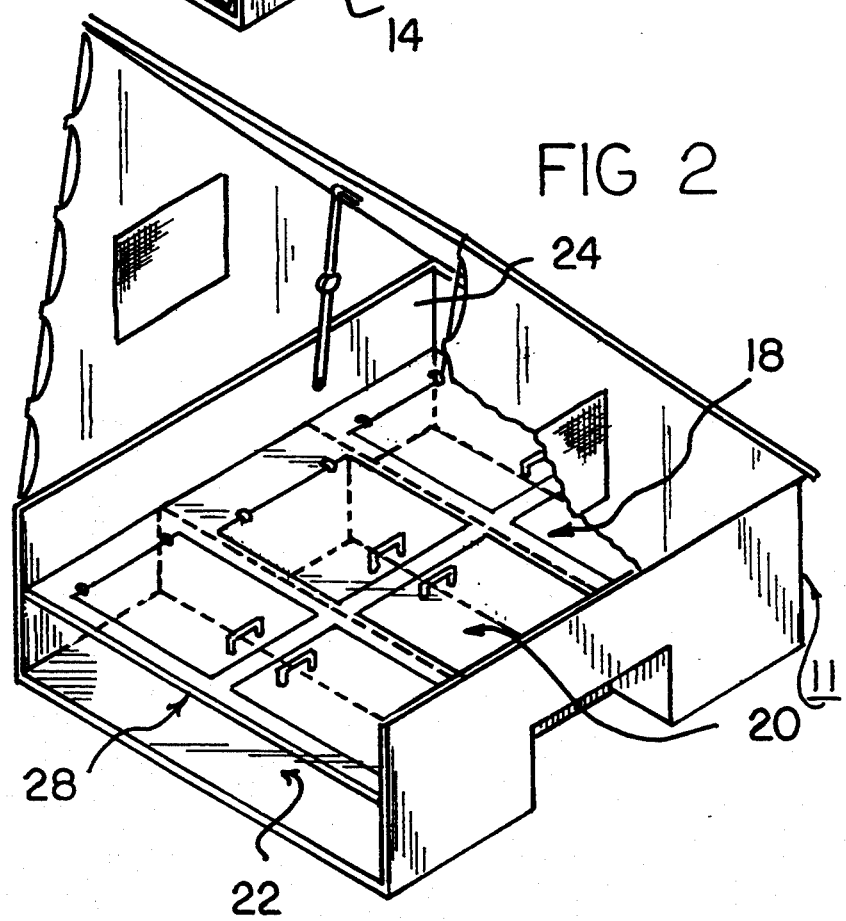
FIG. 2 illustrates the pick-up and forward portion of its associated tent in a deployed orientation with parts broken away to show internal constructions.
Figure 3:
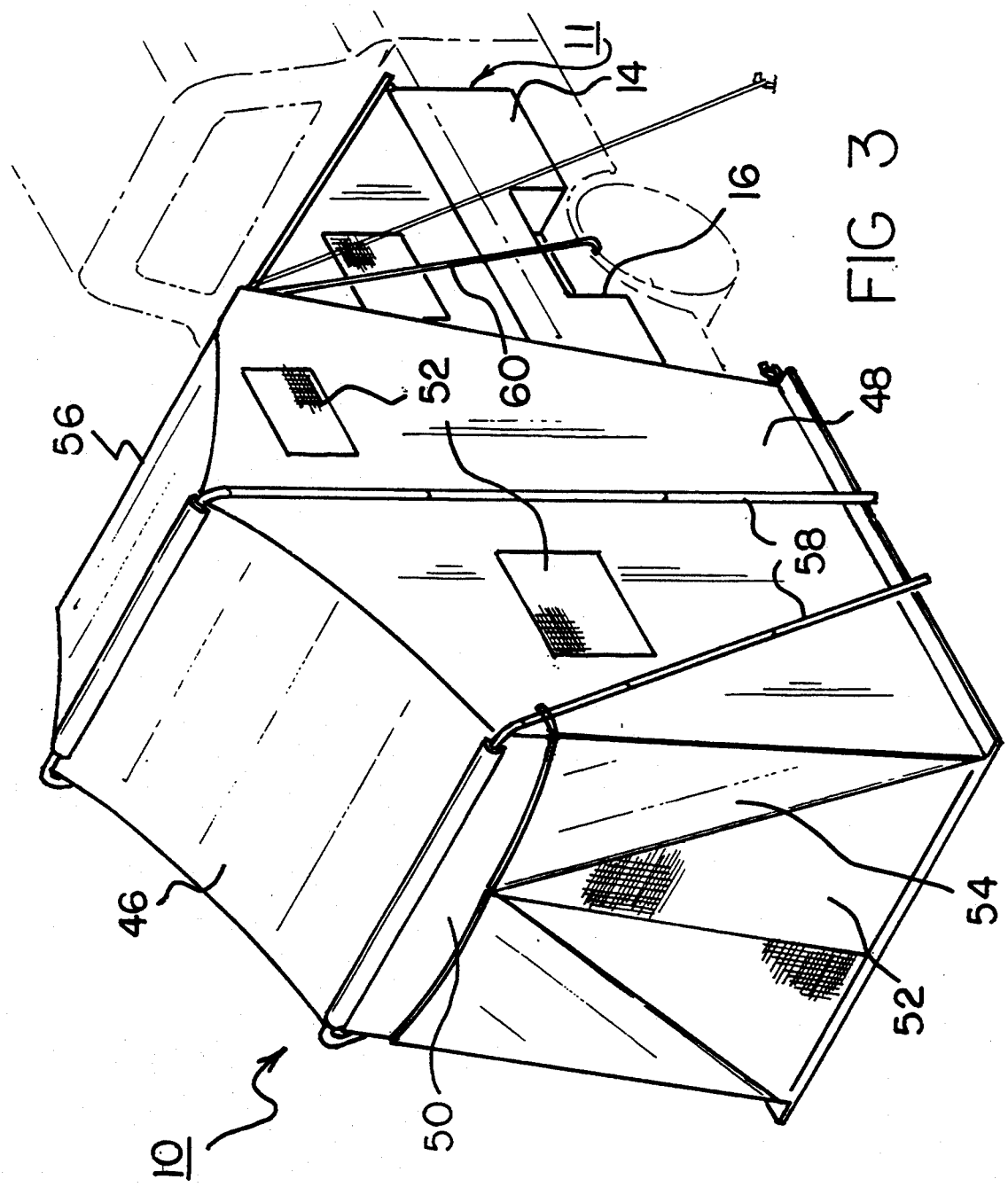
FIG. 3 is a view similar to FIG. 2 but illustrating the pick-up truck and container with the full tent in the deployed orientation.
Figure 4:
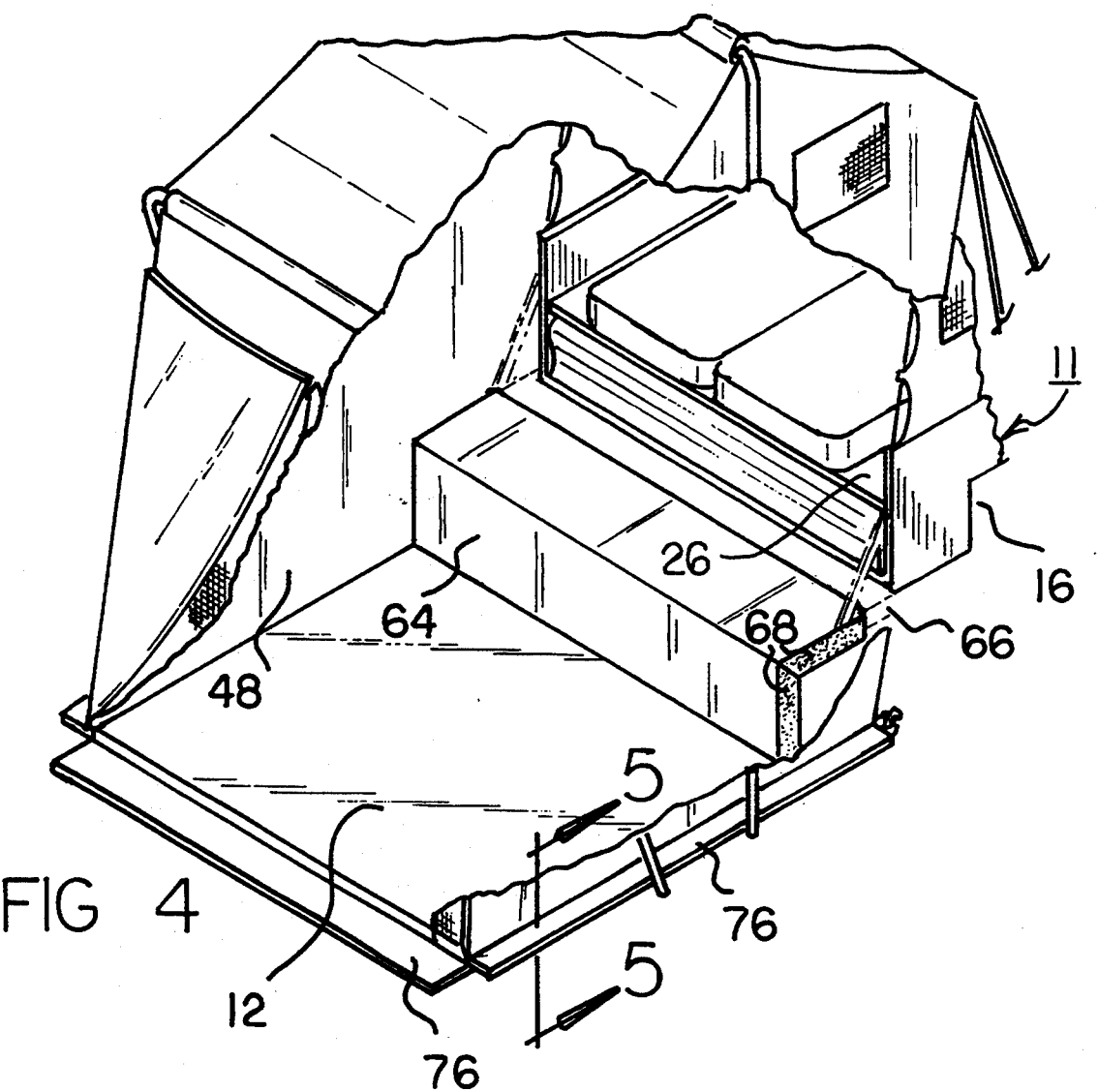
FIG. 4 is a perspective view of the forward tent and the rearward tent in a deployed orientation with parts removed to show certain internal constructions thereof.

With reference now to the drawings, and in particular to FIG. 1 thereof, a new and improved tent system for a pick-up truck embodying the principles and concepts of the present invention and generally designated by the reference numeral 10 will be described.

More specifically, it will be noted in FIGS. 1 through 4, the system 10 includes a container 11 having a separable, generally rectangular piece of hard material constituting a floor 12 outside of the truck bed 14 when deployed. The floor is positionable over the wheel tubs 16 of the truck when in storage. The floor is fabricated of a rigid material and configured to be essentially the same size as that of the flat bed of a truck. The region beneath the floor forwardly of the wheel tubs constitutes a location 18 for the storage of mattresses and the like. The region under the floor between the wheel tubs constitutes a location 20 for the storage of clothing and gear. The region beneath the floor rearwardly of the wheel tubs is a location 22 for the storage of a cooler, stove and supporting equipment. The region immediately above the floor constitutes a location 24 for the storage of tents and poles. A box 28 may be employed over the wheel tubs to divide up the space in the bed to separate such locations. In addition, a second level tier with hatches is provided to access locations 18, 20 and 22 and to hold the floor 12 in place over the tubs. There is preferably a second level tier 26 with hatches that allow access to the lower locations 18, 20 and 22. This tier 26 is where the mattress and sleeping material will rest when deployed. The tent fabric, poles and floor 12 will rest on this tier when in the stored configuration. The floor is located above the tent fabric and poles so it may be deployed and situated prior to removing the tent and pole assemblies.

A rigid lid 34 is next provided. The lid is of a size to cover the bed of a pick-up truck that includes a hinge 36 coupled between the forward edge of the lid and the forward edge of the container. Fabric material 38 with screens 40 is secured at its upper edges to those parallel edges of the lid adjacent to the hinge and the side edges of the container. Such edges are transverse to the hinge 36. The lid is adapted to be raised to an angled elevated orientation during deployment. When raised, the lid is supported by an adjustable rod 42. When in storage, the lid is adapted to rest upon the upper edges of the pick-up to seal the contents of a pick-up.

Also provided is a tent 46 having parallel sidewalls 48 extending transversely to the hinge. The tent has a rear wall 50 with a screen 52 and with an entry flap 54. An opened forward end 56 positionable over the upper rear extent of the lid when in the deployed orientation. This allows for communication between the interior of the tent and the interior of the pick-up. The tent is positionable over the floor 12 when deployed. The tent also has adjustable poles 58 for supporting it in the proper deployed orientation. Associated tie down members 60 are located at the leading upper edge of the tent for coupling to the truck with respect to the raised lid.

A tent fabric 64 is positionable over the tail gate 66 of the pick-up truck with the depending section located to shield the interior of the tent from the space beneath the tail gate. The fabric 64 includes pile type fasteners 68 at its edges for releasable coupling with cooperable pile type fasteners at adjacent sections of the tent interior.

The container 11 of the present invention is self-contained so that it may be easily removed from the truck as a unit. In an alternate embodiment of the invention, the lid may be constructed of a larger size and hinged to the forward edge of the truck bed. Releasable couplings are then provided for detaching the fabric material from the parallel edges of the lid. In this manner, the container may be removed and the truck may be utilized with a hard lid cover over the bed.

Figure 5:
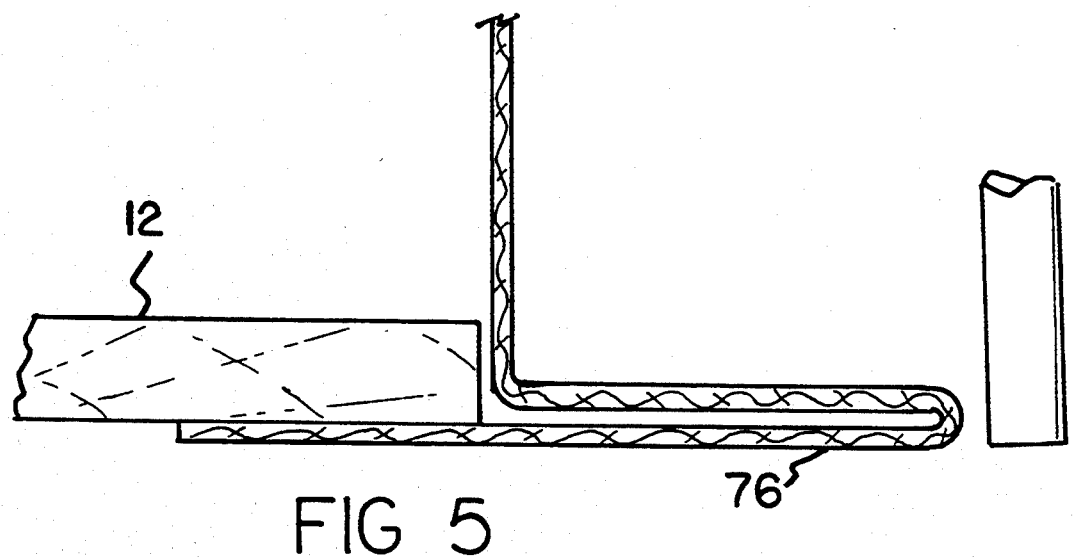
FIG. 5 is a sectional view taken along line 5—5 of FIG. 4.

FIG. 5 illustrates the sides of the tent at their lower extents. Such tent material includes folds 76 formed by tent material of an extended length which is folded upon itself. Such folds are at the tent sides and rear to accommodate the elevating of the upper extent of the tent to an extended elevation.

Figure 6:
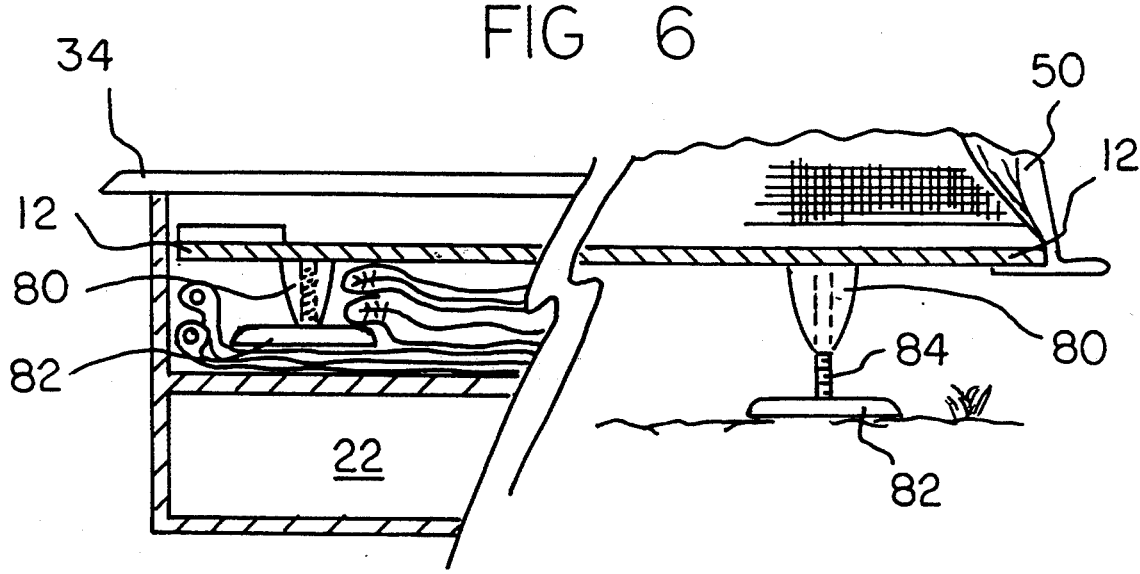
FIG. 6 is a cross-sectional view of an alternative embodiment of the invention.
Figure 7:
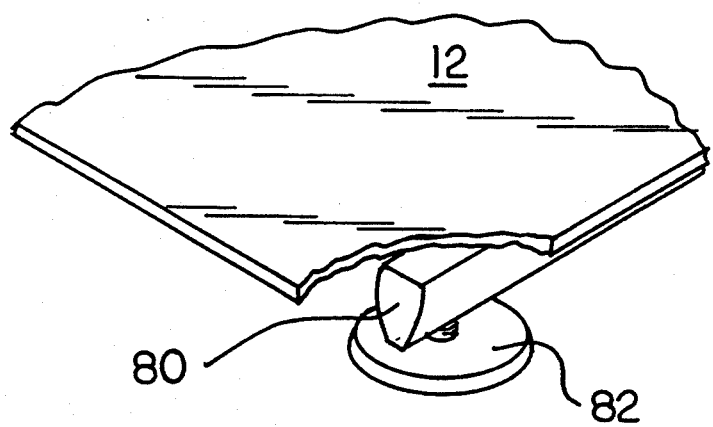
FIG. 7 is a perspective view of the corner of the floor.

An alternate embodiment of the invention is shown in FIGS. 6 and 7. As shown, the floor has two parallel rails 80 therebeneath. Adjustable feet 82 are at each of the four corners of the floor beneath the rails. These feet have large diameter pads and are independently adjustable through screws 84 to elevate and level the floor to undulations of the ground surface. Furthermore, this method would physically be part of the floor unit and would create a means of putting the floor above the tent and poles when stored. This is because the floor would have to be situated and leveled before assembling the tent and poles. Such alternate embodiments include a tubular pneumatic member so formed on a sheet 82 positioned beneath the floor 12 when deployed. The tube 80 is inflatable selectively by valve 84 to raise and/or lower the floor 12 in the event of rain, snow or other moist conditions to thereby provide greater comfort for users of the system.

It can be readily understood that the present invention offers an alternative option to the pick-up truck camper and camper shell as well as the tent trailer or a plain tent. It offers the capability of portable shelter for two to four persons, two of which can sleep off of the ground, and still maintain pick-up aesthetics when in the stored orientation.

The system as described above is a self-contained unit comprised of a container, with a lid, which can be inserted in the bed of a pick-up truck. This container has two tiers: storage and sleeping. The upper level has facility for storage of a hard floor with tent material and tent poles attached when in the lid down storage orientation while the upper level supports the mattresses for sleeping when in the lid up deployed orientation. The lower level is for storage: (a) Lower forward of wheel tubs is for storage of mattresses when storage, hard floor, tent and poles are on the upper level with the lid down; (b) Lower between wheel tubs is for storage of personal items, clothes, fishing, hunting or playing equipment; and (c) Lower rear of wheel tubs is for storage of working stove/barbecue, food items, ice chest or cooler, heater, etc.

In operation, the system quickly, conveniently and reliably converts from a pick-up bed cover to a tent integrally attached to the bed of a truck. The steps are as follows:

a) Open tailgate, lift lid, lock lid poles to corners of container. The permanent canvas sides, lid to top edge of container, extend and go taut as the lid is set into position.

b) Slide hard floor off-top level onto ground behind truck. The small canvas attaches to slide floor and bottom edge of lower tier extends over tailgate and closes-in tent at that point.

c) Pull up/forward tent poles with canvas attached and position poles. Extend canvas over hard lid and stake ropes to ground at front and rear of truck bed both sides.

d) Extend tent poles until canvas is taut. Flip out extender flaps to increase floor space.

e) Reverse procedure to store into truck. Optional equipment includes lights, heater, gas cylinder, etc.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by letters patent of the United States is as follows:

1. A tent system for use in association with the bed of a pick-up truck comprising, in combination:

a container including a separable, generally rectangular piece of hard material constituting a tent platform outside of the truck bed when deployed and positionable within the container over the wheel wells of the truck when in storage, the container being fabricated of a rigid material and configured to be of a slightly smaller size than that of the truck bed and having a raised floor, the region beneath the floor forwardly of the wheel wells constituting a region for the storage of mattresses and the like, the region under the floor between the wheel wells constituting a location for the storage of clothing and gear and the region beneath the floor rearwardly of the wheel wells for the storage of a cooler, stove and supporting equipment, the region immediately above the floor constituting a region of the storage of tents and poles;

a rigid lid of a size to cover the bed of a pick-up truck at a lower elevation with a hinge coupled to the forward edge of the lid and the forward edge of the container, fabric material with screens located between the side edges of the container and the parallel edges of the lid adjacent to the hinge and transverse to the hinge, the lid and fabric material adapted to be raised to an angled elevated orientation during deployment with an adjustable rod for support and adapted to be rested upon the upper edges of the container during storage to seal the contents of a the bed;

a tent having parallel sidewalls transverse to the hinge and a rear wall with an entry flap and an open forward end at a raised location and positionable over the raised upper rear extent of the lid when deployed to allow for communication between the interior of the tent and the interior of the pick-up, the tent also having poles for support when deployed and associated tie down members at the forward upper edge of the tent for coupling with respect to the raised lid; and a fabric section positionable over the tail gate of the pickup with a depending section to shield the interior of the tent from the space beneath the tail gate, the fabric section having pile-type fasteners at its lateral edges for coupling with the adjacent sides of the tent.

* * * * *